(12) United States Patent
Perrot (10) Patent No.: US 11,454,543 B2
(45) Date of Patent: Sep. 27, 2022

(54) APPARATUS AND METHOD FOR MEASURING THE SURFACE TEMPERATURE OF A SUBSTRATE

(71) Applicant: LASER SYSTEMS & SOLUTIONS OF EUROPE, Gennevilliers (FR)

(72) Inventor: Sylvain Perrot, Gennevilliers (FR)

(73) Assignee: LASER SYSTEMS & SOLUTIONS OF EUROPE, Gennevilliers (FR)

( * ) Notice: Subject to any disclaimer, the term of this patent is extended or adjusted under 35 U.S.C. 154(b) by 285 days.

(21) Appl. No.: 16/769,391

(22) PCT Filed: Dec. 3, 2018

(86) PCT No.: PCT/EP2018/083376
§ 371 (c)(1),
(2) Date: Jun. 3, 2020

(87) PCT Pub. No.: WO2019/110524
PCT Pub. Date: Jun. 13, 2019

(65) Prior Publication Data
US 2020/0292390 A1    Sep. 17, 2020

(30) Foreign Application Priority Data
Dec. 5, 2017    (EP) .................................... 17205566

(51) Int. Cl.
*G01J 5/00* (2022.01)
*G01J 5/0806* (2022.01)
(Continued)

(52) U.S. Cl.
CPC .......... *G01J 5/0007* (2013.01); *G01J 5/0802* (2022.01); *G01J 5/0806* (2013.01); *G01J 5/0808* (2022.01);
(Continued)

(58) Field of Classification Search
CPC .......... G01J 5/00; G01J 5/0007; G01J 5/0802; G01J 5/0806; G01J 5/0808; G01J 5/0821;
(Continued)

(56) References Cited

U.S. PATENT DOCUMENTS 4,956,538 A * 9/1990 Moslehi ................ G01J 3/0243
374/161
4,979,133 A   12/1990 Arima et al.
(Continued)

FOREIGN PATENT DOCUMENTS

EP    0 493 827    7/1992

OTHER PUBLICATIONS

International Search Report, PCT/PCT/EP2018/083376, dated Feb. 5, 2019.
(Continued)

*Primary Examiner* — Tung S Lau
(74) *Attorney, Agent, or Firm* — Nixon & Vanderhye (57) ABSTRACT

An apparatus for measuring surface temperature of a substrate being illuminated by a pulsed light beam configured to heat the substrate and by a beam of probing light, wherein the heated substrate emits a radiated beam of thermal radiation, wherein the apparatus includes an optical system configured to collect the radiated beam and a reflected beam of probing light propagating in substantially close directions, wherein the collected radiated beam and the collected reflected beam are separately routed to a respective detector via a respective routing element, the respective detectors being configured to measure the intensity of the collected radiated beam and collected reflected beam simultaneously and at the same wavelength, wherein the surface temperature is calculated based on the collected radiated beam and on the collected reflected beam.

20 Claims, 5 Drawing Sheets

(51) Int. Cl.
  *G01J 5/0821* (2022.01)
  *G01J 5/08* (2022.01)
  *G01J 5/59* (2022.01)
  *G01J 5/0802* (2022.01)
  *G01J 5/0808* (2022.01)

(52) U.S. Cl.
  CPC ............ *G01J 5/0821* (2013.01); *G01J 5/0846* (2013.01); *G01J 5/0896* (2013.01); *G01J 5/59* (2022.01); *G01J 2005/0074* (2013.01)

(58) Field of Classification Search
  CPC .......... G01J 5/0846; G01J 5/0896; G01J 5/59; G01J 2005/0074; G01J 5/07; G01J 5/084; G01J 5/80
  See application file for complete search history.

(56) References Cited

U.S. PATENT DOCUMENTS

| | | | | |
|---|---|---|---|---|
| 4,979,134 A | * | 12/1990 | Arima | G01J 5/532 250/339.04 |
| 5,326,173 A | | 7/1994 | Evans et al. | |
| 5,738,440 A | * | 4/1998 | O'Neill | G01J 5/0802 250/339.04 |
| 6,082,892 A | * | 7/2000 | Adel | G01J 5/0805 374/E11.018 |
| 6,891,124 B2 | * | 5/2005 | Denton | H01L 22/26 374/E11.018 |
| 7,234,862 B2 | * | 6/2007 | Johnson | G01K 11/125 374/E11.019 |
| 2002/0189757 A1 | * | 12/2002 | Denton | H01L 22/26 118/712 |
| 2004/0061057 A1 | * | 4/2004 | Johnson | G01K 11/00 250/341.1 |
| 2007/0009010 A1 | * | 1/2007 | Shio | G01K 11/125 374/161 |
| 2011/0064114 A1 | * | 3/2011 | Zettler | G01J 5/0003 374/121 |

OTHER PUBLICATIONS

Hatano et al., "Excimer Laser-Induced Temperature Field in Melting and Resolidificatin of Silicon Thin Films"., Journal of Applied Physics, vol. 87, No. 1, Jan. 2000.

* cited by examiner

APPARATUS AND METHOD FOR MEASURING THE SURFACE TEMPERATURE OF A SUBSTRATE

TECHNICAL FIELD OF THE INVENTION

The invention relates to a device for monitoring the surface temperature of a wafer undergoing a thermal processing.

More precisely, the invention relates to a device for monitoring the surface temperature of a wafer submitted to a pulsed light beam by measuring its thermal radiation and its emissivity.

BACKGROUND INFORMATION AND PRIOR ART

To manufacture semiconductor devices, a semiconductor wafer is exposed to a pulsed light beam during a process called thermal processing. During the thermal processing, the surface of the areas exposed to the pulsed light beam is heated above 1000° C. during periods lasting from less than one millisecond to less than a microsecond.

The high temperature causes the exposed areas to undergo a structural change. Since the extent of the structural changes is dependent on the temperature, it is critical to monitor the temperature accurately.

The temperature of the surface of the exposed area is usually calculated based on measurement of its thermal radiation. However, thermal radiation of a surface depends not only on its temperature, but also on its emissivity. In order to reduce the temperature measurement error, it is therefore necessary to distinguish whether a variation in thermal radiation is due to a real variation in temperature or to a variation in emissivity.

Emissivity of a surface depends on its structure. Since thermal processing changes the structure of the surface, the emissivity of the exposed areas is not constant throughout the processing. It is therefore important to measure it as frequently as possible. It is also important to note that emissivity is directional.

In practice, to measure the temperature, an optical system collects the thermal radiation and transmits it to a detector. The thermal radiation is measured at a predetermined wavelength, usually in the infrared.

To measure the emissivity, another light beam is directed at the exposed area and the reflected light beam—representative of the emissivity—is captured. As thermal radiation and emissivity are both wavelength dependent, the wavelength of the other light beam is the same as the predetermined wavelength of thermal radiation.

As described in HATANO et al. ("*Excimer laser-induced temperature field in melting and resolidification of silicon thin films*", Journal of applied Physics, 1 Jan. 2000, Vol. 87, No. 1, pages 36 to 43), due to the directionality of emissivity, devices of the prior art use the same optical system and the same detector to capture the thermal radiation and the emissivity of the exposed area. However, in order not to mix the two signals, the thermal radiation measurement and the emissivity measurement are conducted alternatively. The other light beam is turned off when the thermal radiation is being measured.

The accuracy of the temperature measured with devices of the prior art is then limited by the time difference between the measurement of the two signals.

Error in temperature further increases for thermal processing in the microsecond and sub-microsecond range. On this time scale, the pulses of the laser beam exhibit a duration of a few nanoseconds. Devices of the prior art are not able to perform temperature measurements that can follow the evolution of temperature during the exposure to the pulsed light beam.

SUMMARY OF THE INVENTION

Therefore one object of the invention is to provide an apparatus for measuring a surface temperature of a substrate having a substantially planar processed surface, said processed surface being illuminated by a pulsed light beam adapted to heat a treated zone of said processed surface of the substrate, said apparatus comprising:
  a first illumination system emitting a first beam of probing light at a first wavelength of probing light towards said treated zone of the processed surface of the substrate;
  a first optical system configured to:
    collect a first radiated beam of thermal radiation radiated by a locally heated area in said treated zone over a first solid angle of thermal radiation in a first direction of thermal radiation; and transmit said first radiated beam to a first detection channel of thermal radiation adapted to deliver a first signal of thermal radiation representative, at a first instant, of a first intensity of the first radiated beam within a first bandwidth around a first wavelength of thermal radiation; and
    collect a first reflected beam of probing light reflected by said treated zone over a first solid angle of probing light in a first direction of probing light; and transmit said first reflected beam to a first detection channel of probing light adapted to deliver a first signal of probing light representative, at a second instant, of a first intensity of the first reflected beam at said first wavelength of probing light; and
  processing means configured to:
    process said first signal of thermal radiation and said first signal of probing light; and
    determine said surface temperature of the treated zone at said first instant based on said first processed signal of thermal radiation and said first processed signal of probing light;
  according to the invention:
  said first detection channel of thermal detection includes:
    a first detector of thermal radiation sensitive to said first wavelength of thermal radiation; and
    a first routing means of thermal radiation to route the first radiated beam to the first detector of thermal radiation; and
  said first detection channel of probing light includes:
    a first detector of probing light sensitive to said first wavelength of probing light; and
    a first routing means of probing light to route the first reflected beam to the first detector of probing light,
  said first wavelength of thermal radiation is selected to be equal to said first wavelength of probing light;
  said first detection channel of thermal radiation and said first detection channel of probing light are synchronized so that said first instant and said second instant occur at the same time;
  said first routing means of thermal radiation is arranged in relation with said first routing means of probing light to prevent the first detector of thermal radiation from receiving part of the first reflected beam of probing light, wherein said first direction of thermal radiation is separated from said first direction of probing light by a first angle of deviation greater than zero and lower than a first predetermined threshold.

By using two different detection channels and routing means to route each signal to a distinct detector, the apparatus is able to measure simultaneously the thermal radiation of the surface of the treated zone and its emissivity. As the first routing means are arranged in relation to each other so that the thermal radiation and emissivity of almost the same region of the processed surface are measured, directionality of the emissivity can be taken into account. The error in the temperature calculated based on the thermal radiation and on the emissivity is therefore greatly reduced.

Other advantageous and non-limiting features of the apparatus according to the invention include:
- said first wavelength of probing light is comprised in the range from 0.9 micrometer to 1.6 micrometer,
- first bandwidth is smaller than or equal to 100 nanometers.
- said first detection channel of thermal radiation comprises a first filter of thermal radiation having said first bandwidth,
- said first detection channel of probing light comprises a first filter of probing light,
- said first filter of probing light is a bandpass filter having a second bandwidth smaller than or equal to the first bandwidth,
- said first filter of thermal radiation or said first filter of probing light is an interferential filter,
- said first detector of thermal radiation and said first detector of probing light have the same relative spectral sensitivity,
- the apparatus further comprises:
  - a second illumination system emitting a second beam of probing light at a second wavelength of probing light towards said treated zone of the processed surface of the substrate;
  - a second optical system configured to:
    - collect a second radiated beam of thermal radiation radiated by said locally heated area of the treated zone over a second solid angle of thermal radiation in a second direction of thermal radiation; and transmit said second radiated beam to a second detection channel of thermal radiation including:
      - a second detector of thermal radiation sensitive to a second bandwidth; and
      - a second routing means of thermal radiation to route the second beam of thermal radiation radiated in the second direction of thermal radiation to the second detector of thermal detection,
    - said second detection channel of thermal radiation being adapted to deliver a second signal of thermal radiation representative, at the first instant, of a second intensity of the second radiated beam within said second bandwidth around a second wavelength of thermal radiation; and
    - collect a second reflected beam of probing light reflected by said treated zone over a second solid angle of probing light in a second direction of probing light; and transmit said second reflected beam to a second detection channel of probing light including:
      - a second detector of probing light sensitive to said second wavelength of probing light; and
      - a second routing means of probing light to route the second beam of probing light reflected in the second direction of probing light to the second detector of probing light,
    - said second detection channel of probing light being adapted to deliver a second signal of probing light representative, at the second instant, of a second intensity of the second beam of probing light at said second wavelength of probing light;
  - said second bandwidth contains said second wavelength of probing light and is smaller than a predetermined maximum width; and
  - said second direction of thermal radiation being separated from said second direction of probing light by a second angle deviation greater than zero and lower than a second predetermined threshold.
- said processing means being configured to:
  - process said second signal of thermal radiation and said second signal of probing light; and
  - determine said surface temperature at the first instant based on said first processed signal of thermal radiation, said first processed signal of probing light, said second processed signal of thermal radiation and said second processed signal of probing light.
- said second optical system is distinct from said first optical system.
- said second optical system and said first optical system are the same.
- each of the routing means comprises a segment of optical fiber of predetermined length arranged between the corresponding optical system and the corresponding detector, said optical system being design to couple the corresponding beams into said segments of optical fibers,
- said segments of optical fibers are grouped together so as to form a fiber bundle.

The invention also relates to a method for measuring a surface temperature of a substrate having a substantially planar processed surface, said processed surface being illuminated by a pulsed light beam adapted to heat a treated zone of said processed surface of the substrate, said method comprising the steps of:
- emitting a first beam of probing light at a first wavelength of probing light towards said treated zone of the processed surface of the substrate,
- measuring, at a first instant, a first signal of thermal radiation representative of a first intensity of a first radiated beam of thermal radiation radiated, within a first bandwidth around a first wavelength of thermal radiation, by said treated zone over a first solid angle of thermal radiation in a first direction of thermal radiation;
- measuring, at a second instant, a first signal of probing light representative of a first intensity of a first reflected beam of probing light reflected, at said first wavelength of probing light, by said treated zone over a first solid angle of probing light in a first direction of probing light,
- processing said first signal of thermal radiation and said first signal of probing light; and
- determining said surface temperature of the treated zone at said first instant based on said first processed signal of thermal radiation and on said first processed signal of probing light;
- the method being characterized in that:
- said first wavelength of thermal radiation is selected to be equal to said first wavelength of probing light;

said first direction of thermal radiation is separated from said first direction of probing light by a first angle of deviation greater than zero and lower than a first predetermined threshold; and said first detection channel of thermal radiation and said first detection channel of probing light are synchronized so that said step of measuring the first signal of probing light is performed at the same time as the said step of measuring the first signal of thermal radiation.

Other advantageous and non-limiting features of the method according to the invention include:

emitting a second beam of probing light at a second wavelength of probing light towards said treated zone of the processed surface of the substrate, measuring, at a third instant, a second signal of thermal radiation representative of a second intensity of a second radiated beam of thermal radiation radiated, within a second bandwidth around a second wavelength of thermal radiation, by said treated zone over a second solid angle of thermal radiation in a second direction of thermal radiation;

measuring, at a fourth instant, a second signal of probing light representative of a second intensity of a second reflected beam of probing light reflected, at said second wavelength of probing light, by said treated zone over a second solid angle of probing light in a second direction of probing light, processing said second signal of thermal radiation and said second signal of probing light; and determining said surface temperature of the treated zone at said first instant based on said first processed signal of thermal radiation, said first processed signal of probing light, said processed second signal of thermal radiation and said processed second signal of probing light;

said second wavelength of thermal radiation is selected to be equal to said second wavelength of probing light;

said second direction of thermal radiation is separated from said second direction of probing light by a second angle of deviation greater than zero and lower than a second predetermined threshold;

said second detection channel of thermal radiation and said second detection channel of probing light are synchronized so that said step of measuring the second signal of probing light and said step of measuring the second signal of thermal radiation are performed at the same time as said step of measuring the first signal of thermal radiation and said step of measuring the first signal of probing light.

DETAILED DESCRIPTION OF EXAMPLE(S)

The apparatus and method according to the invention will be described next, in reference with the appended drawings.

APPARATUS

Figure 1:
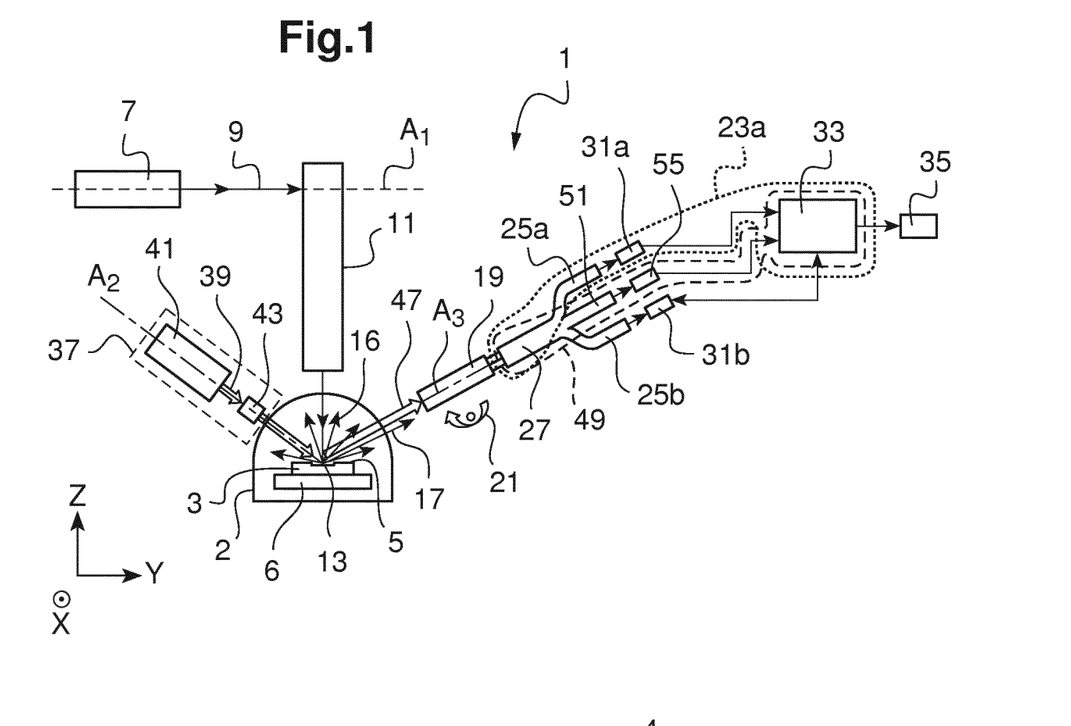
FIG. 1 is a schematic view of an example embodiment of the apparatus for measuring surface temperature of a substrate by measuring its thermal radiation and emissivity according to the invention.

Referring to FIG. 1, the invention relates to an apparatus 1 for measuring a surface temperature Ts of a substrate 3 having a substantially planar processed surface 5. The apparatus 1 generally operates in a machine environment, such as a semiconductor foundry, consequently, it has to comply with volume limitation and mechanical constraints.

The substrate 3 is for example a wafer. It typically is a silicon wafer or a compound wafer, such as commonly used in the semiconductor devices industries. The substrate 3 is placed in a process chamber 2 adapted for thermal processing.

The substrate 3 may be arranged on a moveable platform 6. The moveable platform may be able to move in the X direction and in the Y direction to allow thermal processing of the whole substrate 3.

Figure 2:
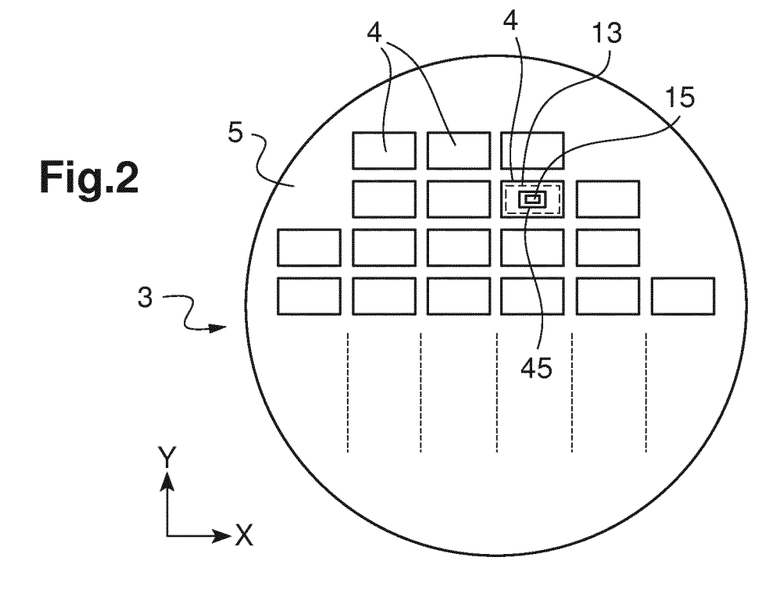
FIG. 2 is a schematic view of an example substrate being tested by the apparatus.

Referring to FIG. 2, the substrate 3 has a processed surface 5 that is able to receive various treatments in order to obtain the desired semiconductor device. The processed surface 5 is substantially plane (at the macroscopic scale), yet it presents some surface roughness (at the microscopic scale).

The roughness of the processed surface 5 depends on the treatment it previously received. Furthermore, thermal processing of the surface may change the physical properties of the material of the processed surface 5, in particular its optical properties. The physical properties changes especially occur during a phase transition of the processed surface 5. As a consequence, the emissivity of the processed surface 5 changes throughout the process.

The substrate 3 supports an array of dies 4 on its processed surface 5. Each die 4 comprises a plurality of semiconductor devices, and each of the dies may have its own emissivity.

Referring back to FIG. 1, the apparatus 1 comprises a light source 7 that emits a pulsed light beam 9 along an optical axis A1. The light source 7 is for example a Ultra-Violet (UV) source. The light source 7 is preferably an excimer laser light source. A preferred wavelength of emission is for instance 308 nm.

The light source 7 is able to operate in pulsed mode. For example, it can produce laser pulse of 160 ns FWHM at a rate of 10 Hz.

An optical injection system 11 of pulsed light beam 9 is arranged downstream of the light source 7 along the optical axis A1. The optical injection system 11 of pulsed light beam 9 receives the pulsed light beam 9 and to direct it at the processed surface 5 of the substrate 3.

The optical injection system 11 of pulsed light beam 9 includes for instance a beam homogenizer (not represented) to ensure spatial uniformity of the pulsed light beam 9 and a plurality of lenses (not represented) to focus the pulsed light beam 9 on the processed surface 5.

The optical injection system 11 of pulsed light beam 9 may also include a folding mirror or a combination thereof to make the apparatus 1 more compact while providing proper orientation to the pulsed light beam 9.

Referring to FIG. 2, the pulsed light beam 9 is incident on the processed surface 5 where it forms a light spot 13. The dimension of the spot is configurable. The dimension of the spot corresponds for example to the area of a die 4. The position of the light spot 13 may be changed by moving the moveable platform 6.

The folding mirror of the injection system 11 may be able to scan the pulsed light beam 9 over the whole surface of the substrate 3. The area on which the light spot 13 forms will be referred to as a treated zone 13.

Under the exposure to the pulsed light beam 9, the treated zone 13 is heated up to a maximal surface temperature Tmax. In the process, the surface temperature Ts of the treated zone 13 varies from ambient temperature Ta (temperature in the process chamber 2) to the maximal temperature Tmax, which range here from 800° C. to 3000° C.

Typically thermal radiation 16 is emitted in all direction (isotropic emission), with a spectrum following the Planck's law. Here, as the treated zone 13 has a surface temperature Ts typically comprised between 25° C. and 1700° C., most of the thermal radiation is emitted in the infrared range, between 1 μm and 10 μm.

The apparatus 1 further includes a first optical system 19 that is arranged downstream the thermal radiation 16. The first optical system 19 has a third optical axis A3 (see FIG. 1).

Figure 3:
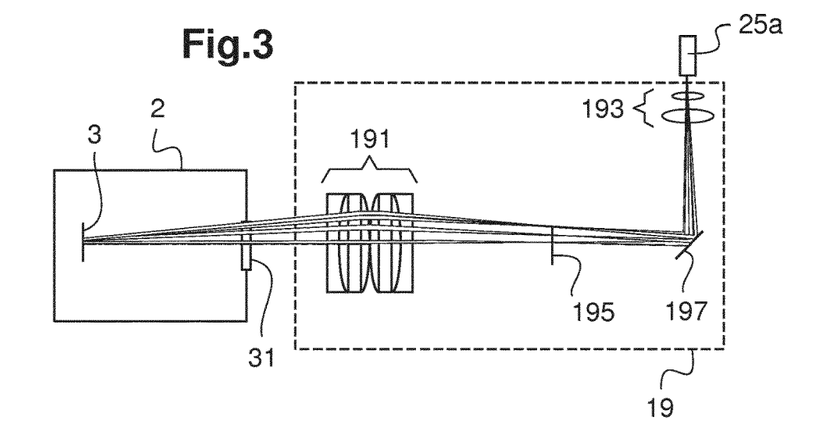
FIG. 3 is a close-up view of an example first optical system, where additional element permits varying the overall length of the first optical system.

Referring to FIG. 3, in practice, the first optical system 19 is situated outside the process chamber 2. A window 31 of the process chamber 2 lets part of the thermal radiation 16 propagate out of the process chamber 2. Only part of the thermal radiation reaches the first optical system 19.

The first optical system 19 is configured to collect a first radiated beam 17 of thermal radiation 16 over a first solid angle of thermal radiation $\Omega_{TR1}$ in a first direction of thermal radiation $D_{TR1}$.

In a preferred example, in order along the first radiated beam 17 propagation (indicated by arrows), the first optical system 19 includes a first optical group 191 a third optical group 195 and a second optical group 193.

The first optical group 191 includes a single collecting lens or a combination of lenses adapted to collect the first radiated beam 17. An example single collecting lens is a plano-convex lens. As mechanical constraints in the machine environment impose to place the first optical group 191 far from the sample, the diameter of the first optical group 191 is large which results in a large focal length.

The third optical group 195 is arranged close to the focal plane of the first optical group 191. The third optical group 195 is configured to conjugate the image of the treated zone 13 with the object focal plane of the second optical group 193. The third optical group 195 permits choosing the overall length of the first optical system 19 and facilitates the integration of the apparatus in the machine environment.

To further reduce the focal length and thus comply with requirements of the machine environment, the second optical group 193 preferably includes a combination of lenses giving the first optical system 19 a large aperture, a moderate field of view, a good spatial resolution and small chromatic aberrations over a large spectral bandwidth in the infrared.

The image of the treated area 13 is placed in the object focal plane of the second group optical group 193 so that it is telecentric. The first optical group 191 makes this conjugation in combination with third optical group 195.

The first optical system 19 comprises here a folding mirror 197 to change the propagation direction of the first radiated beam 17 in order to make the first optical system 19 more compact. Alternatively, a combination of folding mirrors may be used to make the first optical system 19 more compact.

The first optical system 19 collects the first radiated beam 17 over a first solid angle of thermal radiation $\Omega_{TR1a}$ in the first direction of thermal radiation $D_{TR1}$. The extent of the first solid angle of thermal radiation $\Omega_{TR1a}$ is determined by the acceptance angle of the first routing means of thermal radiation 25a that is later described.

In another example, the first optical system 19 only includes the first optical group 191 and the second optical group 193.

Referring back to FIG. 1, the apparatus 1 may comprise a mechanical actuator 21 mechanically connected to the first optical system 19 and configured to change the position of the first optical system 19.

The mechanical actuator 21 is configured to change the position of the first optical system 19 in the X direction and in the Y direction. That way, the first optical system 19 is able to change the area measured within one die 4, or to change die 4.

The mechanical actuators 21 may comprise an active mirror or a combination thereof.

Alternatively, the mechanical actuators 21 may comprise a platform having one translation axis in the X direction and one translation axis in the Y direction. For example, the platform may be able to translate over a 30 mm range in both directions in steps of 0.5 mm.

The apparatus 1 further comprises a first detection channel of thermal radiation 23a arranged downstream of the first optical system 19.

The first detection channel of thermal radiation 23a comprises a first routing means of thermal radiation 25a having an entry end (see FIG. 5) placed in the focal plane of the second optical group 193.

Figure 4:
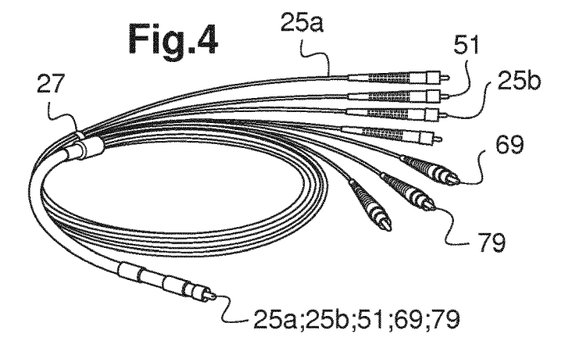
FIG. 4 is a view of the routing means of the apparatus to route the collected thermal radiation and reflected probing light beam from the first optical system.

Referring to FIG. 4, the first routing means of thermal radiation 25a comprises a segment of optical fiber of predetermined length and predetermined diameter. An example length is 15 m. An example diameter is 400 μm. The optical fiber has an acceptance angle comprised between 8° and 15°.

The first routing means of thermal radiation 25a is arranged here in a bundle of fibers, more precisely in a multi-branch fiber bundle 27. Here, the optical fibers are held together at the entry end of the multi-branch fiber bundle 27, and are separated into multiple branches at an exit end of the multi-branch fiber bundle 27.

Multi-branch fiber bundle 27 provides a flexible mechanism for routing the various signals the apparatus 1 measures.

The first routing means of thermal radiation 25a carries the first radiated beam 17.

Figure 6:
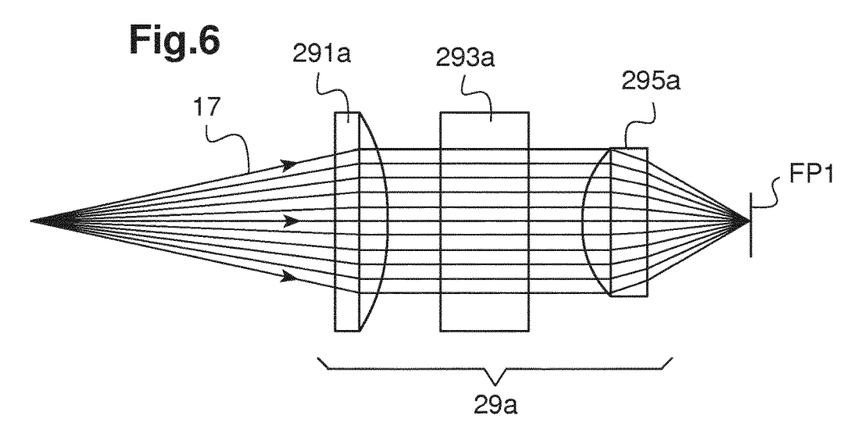
FIG. 6 illustrates the propagation of thermal radiation through a first filtering system of thermal radiation arranged after the routing means.

Referring to FIG. 6, the first detection channel of thermal radiation 23a further comprises a first filtering system of thermal radiation 29a arranged downstream the first routing means of thermal radiation 25a.

The first filtering system of thermal radiation 29a allows adapting the geometry and spectrum of the first radiated beam 17 for its subsequent measurement. In order along the propagation direction of the first radiated beam 17 (indicated by arrows), the first filtering system of thermal radiation 29a includes a first collimating group of thermal radiation 291a, a first filter of thermal radiation 293a, and a first focusing group of thermal radiation 295a.

The first collimating group of thermal radiation 291a comprises a lens or a combination thereof, and collimates the first radiated beam 17 which is divergent upon exiting the first routing means of thermal radiation 25a.

The first filter of thermal radiation 293 controls the spectral width of the first radiated beam 17 and removes unwanted contributions. The first bandwidth is preferably centered on a first wavelength of thermal radiation $\lambda_{TR1}$. The first wavelength of thermal radiation $\lambda_{TR1}$ is selected to be equal to a first wavelength of probing light $\lambda_{PL1}$ that will be described later. The first filter of thermal radiation 293 has a first bandwidth for example smaller than or equal to 100 nm.

An example first filter of thermal radiation 293 is an interferential filter.

The first focusing group of thermal radiation 295 comprises a lens or a combination thereof; it focuses the first radiated beam 17 on a focal plane FP1.

Figure 7:
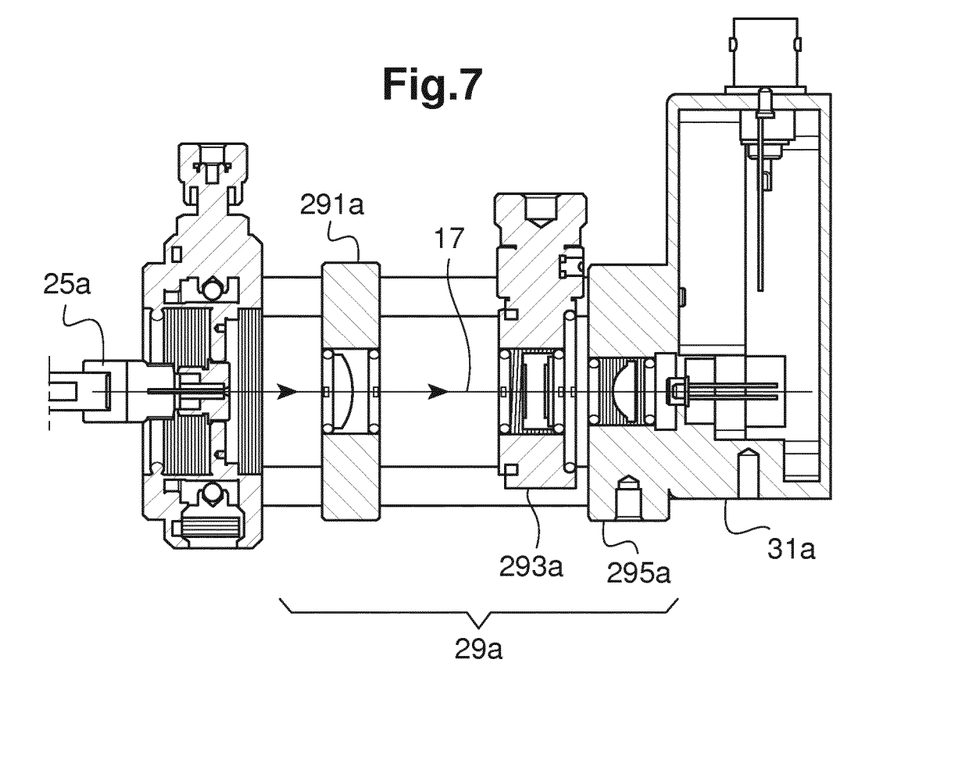
FIG. 7 is a schematic view of the routing means, the first filtering system of thermal radiation and a first detector of thermal radiation.

The first detection channel of thermal radiation 23a further comprises a first detector of thermal radiation 31a that is arranged on the focal plane FP1 of the first focusing group 295a.

The first detector of thermal radiation 31a is sensitive to said first wavelength of thermal radiation $\lambda_{TR1}$. The first detector of thermal radiation 31a operates preferably in the short infrared (example range: from 0.9 μm to 1.6 μm). Alternatively, and depending on the first wavelength of thermal radiation $\lambda_{TR1}$, it may operate in the mid-wavelength infrared (example range: from 3 μm to 5 μm), the long-wavelength infrared (example range: from 8 μm to 12 μm) or the visible (example range: from 0.4 μm to 0.9 μm). An example first detector of thermal radiation 31 sensitive in the short infrared is a photodiode made of InGaAs.

The first detector of thermal radiation 31a delivers a first signal of thermal radiation $S_{TR1a}$ representative, at a first instant $t_1$, of a first intensity of the first radiated beam 17 at the first wavelength of thermal radiation $\lambda_{TR1}$.

Referring back to FIG. 1, the first detector of thermal radiation 31a is operably coupled to a controller 33. The controller 33 comprises for example a digitizer board. The controller 33 digitizes the first signal of thermal radiation $S_{TR1a}$. The controller 33 is also configured to implement a fast acquisition rate of the first radiated beam 17. An example acquisition rate is 500 Megasamples per second (i.e. 200 MHz). We note that the acquisition rate is faster than the duration of the pulse of the pulsed light beam. This allows an accurate monitoring of the surface temperature Ts during the thermal processing.

The apparatus 1 further comprises a processing device 35. The processing device 35 is operably coupled with the controller 33. The processing device 35 receives the first signal of thermal radiation $S_{TR1}$ and processes it according to the method later described. The processing device 35 is for example a computer equipped with a user interface. The user interface allows a user to configure the controller 33 and to monitor it during the measurements. The user interface may also be used to display results of the measurements.

The apparatus 1 further includes a first illumination system 37 (see FIG. 1) that emits a first beam of probing light 39 towards the treated zone 13 of the processed surface 5.

The first illumination system 37 comprises a first illumination source 41 that emits the first beam of probing light 39 along a second optical axis A2. An example first illumination source 41 is an infrared superluminescent diode that emits light at a first wavelength of probing light $\lambda_{PL1}$ comprised in a range from 0.9 μm to 1.6 μm. Examples first wavelength of probing light $\lambda_{PL1}$ are 1.31 μm or 1.55 μm.

The first illumination system 37 also includes a first illumination injection system 43 arranged along the second optical axis A2 downstream the first illumination source 41.

The first illumination injection system 43 comprises one optical lens to collimate the first beam of probing light 39 to illuminate the treated zone 13.

The first illumination injection system 43 may comprise one folding mirror or a combination thereof to fold the first beam of probing light 39 and direct it towards the treated zone 13. Indeed, for ease of illustration, the first beam of probing light 39 is shown as unfolded with only one direction along the second optical axis A2. However, in practice the first beam of probing light 39 may be folded to make the first illumination system 37 more compact and comply with the machine environment.

Referring to FIG. 2, the first beam of probing light 39 is incident on the treated zone 13 of the processed surface 5 where it forms a first illumination spot 45 of dimensions superior to a collection area 15 over which thermal radiation 16 and light reflected from the first beam of probing light 39 are collected.

Part of the light of the first beam of probing light 39 is reflected on the processed surface 5 in a first direction of probing light DPL to form a first reflected beam 47 of probing light 39. The reflection is considered specular.

Another part of the light of the first beam of probing light 39 is absorbed in the substrate 3.

In addition to collecting the first radiated beam 17a, the first optical system 19 collects the first reflected beam 47 in a first direction of probing light $D_{PL1}$ over a first solid angle of probing light $\Omega_{PL1}$.

The first optical group 19 is also configured to adapt the geometry of the first reflected beam 47 for its subsequent measurement.

The first optical system 19 transmits the first reflected beam 47 to a first detection channel of probing light 49 of the apparatus 1.

The first detection channel of probing light 49 is arranged on the focal plane of the second optical group 193. The first detection channel of probing light 49 comprises a first routing means of probing light 51 to receive the first reflected beam 47 from the first optical system 19.

Figure 5:
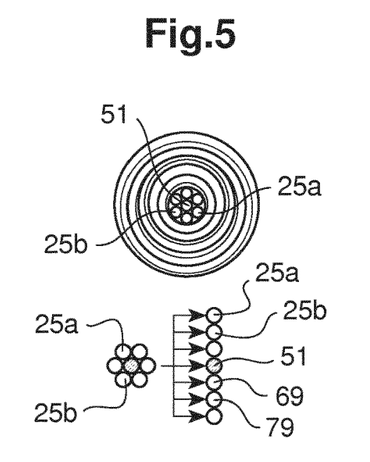
FIG. 5 illustrates a cross-sectional view of an entry end of the routing means of FIG. 4.

Referring to FIG. 5 the first routing means of probing light 51 is arranged at the center of the multi-branch fiber bundle 27.

Figure 8:
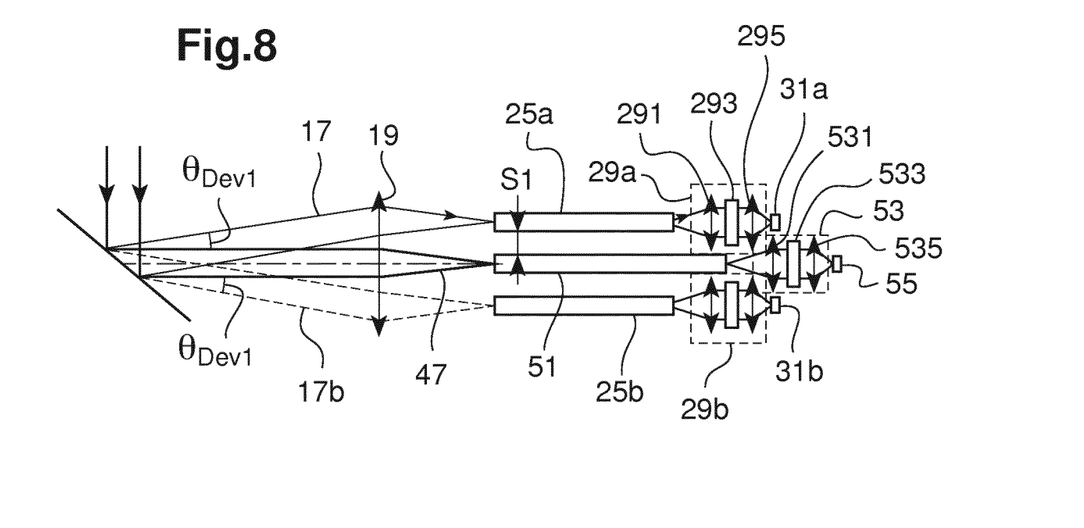
FIG. 8 is a schematic view of the propagation of the thermal radiation and the reflected probing light beam in the apparatus.

Referring to FIG. 8, the first routing means of probing light 51 is arranged in relation with the first routing means of thermal radiation 25a so as to prevent part of the first reflected beam 47 to enter the first routing means of thermal radiation 25a. The respective position of each routing means 25a, 51 with respect to the first optical system 19 determines the direction in which each optical fiber can respectively collect a signal.

Referring to FIG. 8, the first direction of probing light $D_{PL1}$ is separated from the first direction of thermal radiation $D_{TR1a}$ by a first angle of deviation $\theta_{Dev1}$. The first angle of deviation $\theta_{Dev1}$ is greater than zero and lower than a first predetermined threshold. An example first predetermined threshold is 9°. The first routing means of thermal radiation 25a is separated from first routing means of probing light 51 by a distance 51. By increasing the distance 51, the first angle of deviation $\theta_{Dev1}$ increases. Therefore, the risk of first reflected beam 47 entering the first routing means of thermal radiation 25a is decreased. However, since an accurate measurement of surface temperature Ts requires the first radiated beam 17 and first reflected beam 47 to be measured in close direction, the first angle of deviation $\theta_{Dev1}$ cannot be too large. Acceptable values of the first angle of deviation $\theta_{Dev1}$ are comprised between 3 degrees and 5 degrees.

The first routing means of probing light 51 may also be accurately aligned with the first optical system 19 so that the specular radiation of the first reflected beam 47 is directed into the first routing means of probing light 51. This alignment is for example achieved when the third optical axis A3 coincide with the first direction of probing light $D_{PL1}$.

We note that since thermal radiation 16 is isotropic, some thermal radiation enters the first routing means of probing light 51. However, the intensity of the thermal radiation 16 entering the first routing means of probing light 51 is much smaller than the intensity of the first reflected beam 47 and can thus be neglected.

The first detection channel of probing light 49 further comprises a first filtering system of probing light 53 arranged downstream the first routing means of probing light 51.

The first filtering system of probing light 53 adapts the geometry and spectrum of the first reflected beam 47 for its subsequent measurement. In order along the propagation direction of the first reflected beam 47 (indicated by arrows), the first filtering system of probing light 53 includes a first collimating group of probing light 531, a first filter of probing light 533, and a first focusing group of probing light 535.

The first collimating group of probing light 531 and the first focusing group of probing light 535 are similar respectively to the first collimating group of thermal radiation 191 and the first focusing group of thermal radiation 195.

The first filter of probing light 533 controls the spectral width of the first reflected beam 47 and to remove unwanted contributions. The first filter of probing light 533 has a second bandwidth smaller or equal to the first bandwidth. The second bandwidth is preferably centered on the first wavelength of probing light $\lambda_{PL1}$.

The first detection channel of probing light 49 further comprises a first detector of probing light 55 that is arranged at the focal length of the first focusing group of probing light 535.

The first detector of probing light 55 is sensitive to said first wavelength of probing light $\lambda_{PL1}$. The first detector of probing light 55 operates preferably in the short infrared (example range: from 0.9 µm to 1.6 µm). Alternatively, and depending on the first wavelength of thermal radiation $\lambda_{TR1}$, it may operate in the mid-wavelength infrared (example range: from 3 µm to 5 µm), the long-wavelength infrared (example range: from 8 µm to 12 µm) or the visible (example range: from 0.4 µm to 0.9 µm). An example first detector of probing light 55 is a photodiode made of InGaAs.

The first detector of probing light 55 and the first detector of thermal radiation 31 have the same relative spectral sensitivity.

The first detector of probing light 55 delivers a first signal of probing light $S_{PL1}$ representative, at a second instant $t_2$, of a first intensity of the first reflected beam 47 at said first wavelength of probing light $\lambda_{PL1}$.

The first detector of probing light 55 is operably coupled to the controller 33. The controller 33 digitizes the first signal of probing light $S_{PL1}$. The controller 33 also implements a fast acquisition rate of the first reflected beam 47. An example acquisition rate is 500 Megasamples per second.

Furthermore, the controller 33 synchronizes the first detection channel of thermal radiation 23 and the first detection channel of probing light 53 so that said first instant $t_1$ and said second instant $t_2$ occur at the same time.

The simultaneous measuring of both the thermal radiation 16 and the first reflected beam 47 (representative of the emissivity) helps reducing the error in the measurement of the surface temperature Ts.

The processing device 35 receives the first signal of probing light $S_{PL1}$ and processes it according to the method later described.

The apparatus 1 having a single first optical system 19 to collect both first radiated beam 17 and first reflected beam 47, and a routing means to collect them and to route them separately to a respective detector allows a great flexibility in the positioning of the detectors which is important to comply with the volume limitation of the machine environment.

It also allows increasing the number of detectors and therefore increasing the accuracy of the surface temperature Ts as will be described later.

Having a first detector of thermal radiation 31a dedicated to measuring the first radiated beam 17 and a first detector of probing light 55 dedicated to measuring the first reflected beam 47 permits to perform both measurements simultaneously. The surface temperature Ts determined based on these signals simultaneously acquired has a better accuracy than in the prior art.

In a preferred example, the first detection channel of thermal radiation 23 further comprises an additional first routing means of thermal radiation 25b that is arranged at the focal length of the second optical group 193.

As described before, thermal radiation 16 is isotropic. The first routing means of thermal radiation 25b then receives a part of thermal radiation forming an additional first radiated beam 17b. The additional first radiated beam 17b propagates in an additional first direction of thermal radiation $D_{TR1b}$. The first direction of thermal radiation $D_{TR1a}$ and the additional first direction of thermal radiation $D_{TR1b}$ are for example determined each by the position of their respective routing means 25a, 25b. The deviation angle between the first direction of thermal radiation $D_{TR1a}$ and the additional first direction of thermal radiation $D_{TR1b}$ ranges for example between 3 and 9 degrees.

Referring to FIG. 4 the additional first routing means of thermal radiation 25b is arranged in the multi-branch fiber bundle 27.

Referring to FIG. 8, the first detection channel of thermal radiation 23 further comprises an additional first filtering optical system 29b similar to the first filtering optical system 29a, and an additional first detector of thermal radiation 31b similar to the first detector of thermal radiation 31a.

Thanks to the flexibility of multi-branch fiber bundle 27, the additional first detector of thermal radiation 31b may be arranged at a distance from the first detector of thermal radiation 31a.

The additional first detector of thermal radiation 31b delivers an additional first signal of thermal radiation $S_{TR1b}$ representative, at the first instant $t_1$, of a first intensity of the additional first radiated beam 17b at said first wavelength of thermal radiation $\lambda_{TR1}$.

The additional first detector of thermal radiation 31b is operably coupled to the controller 33.

The processing device 35 receives the additional first signal of thermal radiation $S_{TR1b}$ and to process it according to the method later described.

Measuring two signals representative of the thermal radiation 16 of the substrate 3, helps reducing the uncertainty in the calculation of the surface temperature Ts of the substrate 3.

In another example, the apparatus 1 further comprises a first polarization separator to separate the first reflected beam 47 into two beams: an s-polarized first reflected beam and a p-polarized first reflected beam. The polarization separator is arranged downstream the first routing means of probing light 51. More precisely, the polarization separator is arranged in the first filtering system of probing light 53, downstream the first collimating group of probing light 531. An example polarization separator is a polarizing beamsplitter. Another example polarization separator is a Wollaston prism. Each of the polarized first reflected beams is transmitted to a respective detector. This set-up permits to take in account the variation in emissivity with polarization and helps decreasing the uncertainty in the calculation of the surface temperature Ts of the substrate 3.

In another example, the apparatus 1 may comprise a second polarization separator arranged in the additional first filtering optical system 29b. The second polarization separator is arranged between an additional first collimating group and an additional first focusing group. In this case only one of the polarizations is transmitted to the additional first detector of thermal radiation 31b. The other polarization is absorbed by the second polarization separator. This way, the effect of polarization on thermal radiation 16 can be assessed.

Figure 9:
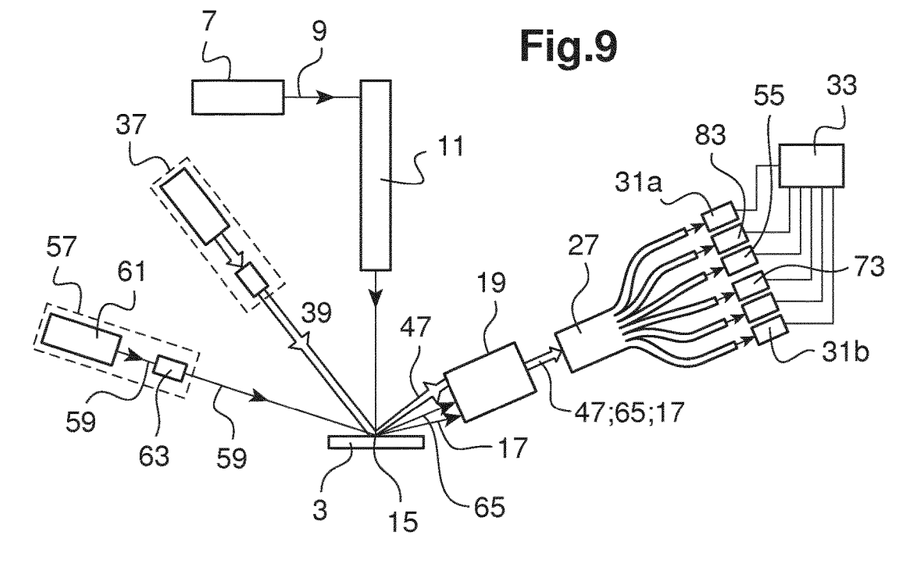
FIG. 9 is a schematic view of another example embodiment of the apparatus, wherein the apparatus comprises two illumination sources.

Another embodiment of the invention is now described in reference to FIG. 9. The apparatus 1 includes a second illumination system 57 that emits a second beam of probing light 59 towards the treated zone 13 of the processed surface 5.

The second illumination system 57 comprises a second illumination source 61 that emits the second beam of probing light 59 along a fourth optical axis A4. An example second illumination source 61 is an infrared superluminescent diode that emits light at a second wavelength of probing light $\lambda_{PL2}$ comprised in a range from 0.9 µm to 1.6 µm. Examples second wavelength of probing light $\lambda_{PL2}$ are 1.31 µm or 1.55 µm. In a preferred example, the first illumination source 41 emits light at 1.31 µm and the second illumination source 61 emits light at 1.55 µm.

The second illumination system 57 also includes a second illumination injection system 63 arranged along the fourth optical axis A4 downstream the second illumination source 61.

The second illumination injection system 63 comprises elements similar to those of the first second illumination injection system 43 and plays a similar role.

In a preferred embodiment (not represented), the first illumination source 41 and the second illumination source 61 are arranged at distance from the substrate 3.

The first illumination source 41 is coupled to an entry end of a first illumination routing means. The coupling is achieved by directly coupling the entry end of the first illumination routing means to an end connector of the first illumination source through a first mating sleeve. The first illumination routing means comprises a first illumination optical fiber.

The second illumination source 61 is coupled to an entry end of a second illumination routing means. The coupling is achieved by directly coupling the entry end of the second illumination routing means to an end connector of the second illumination source through a second mating sleeve. The second illumination routing means comprises a second illumination optical fiber.

The first illumination optical fiber and the second illumination optical fiber are arranged in an illumination multi-branch fiber bundle such that their entry ends are separated into multiple branches, and are held together at an exit end of the illumination multi-branch fiber bundle.

The exit end of the illumination multi-branch fiber bundle is arranged at a focal plane of a common illumination injection system.

The use of the illumination multi-branch fiber bundle provides a flexible mechanism for routing the various beams of probing light 39, 59 from their respective illumination source to a short distance from the substrate 3.

The second beam of probing light 59 is incident on the treated zone 13 of the processed surface 5 where it forms a first illumination spot (not represented) of dimensions superior to the area over which thermal radiation 16 and light reflected from the first beam of probing light 39 and from the second beam of probing light 59 are collected Part of the light of the second beam of probing light 59 is reflected on the processed surface 5 in a second direction of probing light $D_{PL2}$ to form a second reflected beam 65. The reflection is considered specular.

Another part of the light of the second beam of probing light 59 is absorbed in the substrate 3.

In one example, the first optical system 19 collects the second reflected beam 65 in a second direction of probing light $D_{PL2}$ over a second solid angle of probing light $\Omega_{PL2}$, in addition to collecting the first radiated beam 17, and the first reflected beam 47.

The first optical system 19 adapts the geometry of the second reflected beam 65 and to transmit it to a second detection channel of probing light 67 of the apparatus 1.

The second detection channel of probing light 67 is arranged at the focal length of the second optical group 193. The second detection channel of probing light 67 comprises a second routing means of probing light 69 that is arranged to receive the second reflected beam 65 from the first optical system 19.

Referring to FIGS. 4 and 5 the second routing means of probing light 69 is an optical fiber that is arranged in the multi-branch fiber bundle 27.

As described before, since thermal radiation 16 is isotropic, some thermal radiation enters second routing means of probing light 69. However, its effect on the measurement of the second reflected beam 65 can be neglected.

Figure 10:
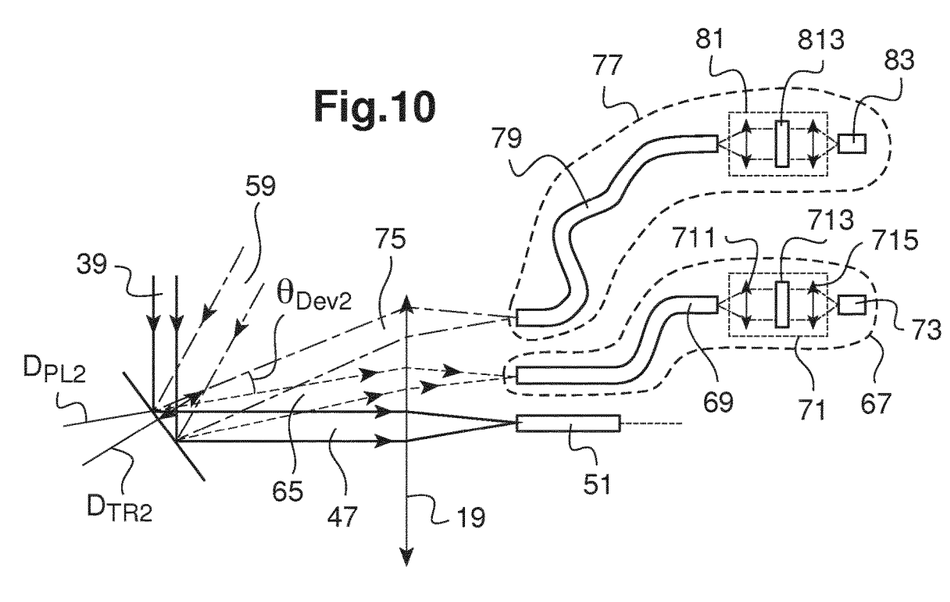
FIG. 10 is a schematic view of the propagation of the thermal radiation and the reflected probing light beam in the example of FIG. 9.
Figure 11:
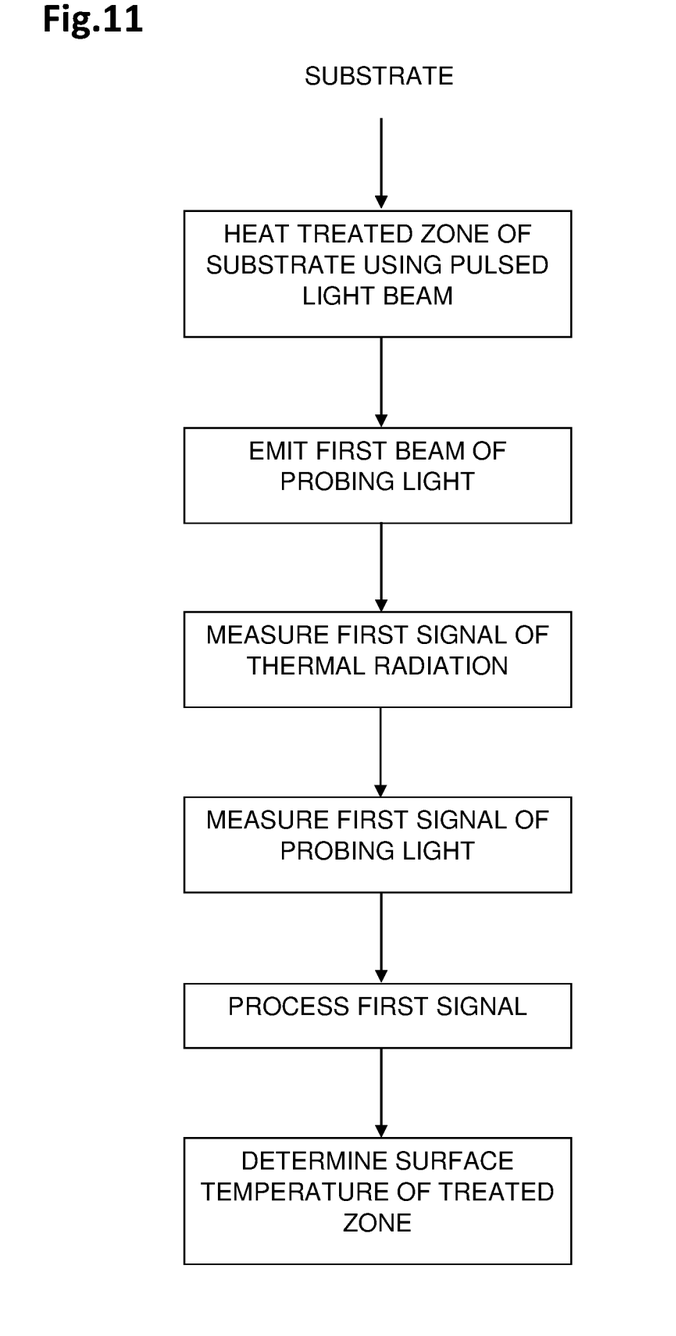
FIG. 11 is a flowchart illustrating the method for measuring surface temperature of a substrate.

Referring to FIG. 10, the second detection channel of probing light 67 further comprises a second filtering system of probing light 71 arranged downstream the second routing means of probing light 69.

The second filtering system of probing light 71 adapts the geometry and spectrum of the second reflected beam 65 for its subsequent measurement.

As described for the other filtering systems 29a, 29b, 53 in order along the propagation direction of the second reflected beam 65 (indicated by arrows), the second filtering system of probing light 71 includes a second collimating group of probing light 711, a second filter of probing light 713, and a second focusing group of probing light 715.

The second collimating group of probing light 711 collimates the second reflected beam 65. The second focusing group of probing light 715 focuses the second reflected beam 65 for its subsequent measurement.

The second filter of probing light 713 controls the spectral width of the second reflected beam 65 and to remove unwanted contributions.

The first filter of probing light 713 has a third bandwidth that do not overlap with the first and the second bandwidth. The third bandwidth contains the second wavelength of probing light $\lambda_{PL2}$. The third bandwidth is smaller than a predetermined maximum, for example smaller than 100 nm.

The second detection channel of probing light 67 further comprises a second detector of probing light 73 that is arranged at the focal length of the second focusing group of probing light 715.

The second detector of probing light 73 is sensitive to said second wavelength of probing light $\lambda_{PL2}$.

The second detector of probing light 73 delivers a second signal of probing light $S_{PL2}$ representative, at the second instant $t_2$, of a second intensity of the second reflected beam 65 at said second wavelength of probing light $\lambda_{PL2}$.

The second detector of probing light 73 is operably coupled to the controller 33.

Furthermore, the controller 33 synchronizes the second detection channel of probing light 67, the first detection channel of thermal radiation 23 and the first detection channel of probing light 53 so that the three measurements are performed simultaneously.

The processing device 35 receives the second signal of probing light $S_{PL2}$ and processes it according to the method later described.

The first optical group 19 may also collect a second radiated beam 75 propagating in a second direction of thermal radiation $D_{TR2}$ over a second solid angle of thermal radiation $\Omega_{TR2}$.

The first optical group 19 transmits the second radiated beam 75 to a second detection channel of thermal radiation 77.

The second detection channel of thermal radiation 77 comprises a second routing means of thermal radiation 79 that is arranged at the focal length of the second optical group 193.

As described before, second routing means of thermal radiation 79 comprises an optical fiber that is arranged in multi-branch fiber bundle 27. The second routing means of thermal radiation 79 transmits the second radiated beam 75.

As described before, the second routing means of thermal radiation 79 is arranged in relation to the second routing means of probing light 69 so as to prevent part of the second reflected beam 65 to enter the second routing means of thermal radiation 79.

The second direction of probing light $D_{PL2}$ is separated from the second direction of thermal radiation $D_{TR2}$ by a second angle of deviation $\theta_{Dev2}$. The second angle of deviation $\theta_{Dev2}$ is greater than zero and is lower than a second predetermined threshold. An example second predetermined threshold is 9°.

The second detection channel of thermal radiation 77 further comprises a second filtering system of thermal radiation 81 arranged downstream the second routing means of thermal radiation 79.

The second filtering system of thermal radiation 81 is similar to the first filtering system of thermal radiation 29 but for its bandwidth. The bandwidth of the second filter of thermal radiation 813 is the third bandwidth.

The second detection channel of thermal radiation 75 further comprises a second detector of thermal radiation 83 that is arranged at the focal length of a second focusing group of thermal radiation 815.

The second detector of thermal radiation 83 is sensitive to a second wavelength of thermal radiation $\lambda_{TR2}$.

The second wavelength of thermal radiation $\lambda_{TR2}$ is equal to the second wavelength of probing light $\lambda_{PL2}$.

The second detector of thermal radiation 83 delivers a second signal of thermal radiation $S_{TR2}$ representative, at the first instant $t_1$, of a second intensity of the second radiated beam 75 at said second wavelength of thermal radiation $\lambda_{TR2}$.

The second detector of thermal radiation 83 is operably coupled to the controller 33 which operates as described before. The controller 33 is configured so that the first radiated beam 17, the first reflected beam 47, the second radiated beam 75 and the second reflected beam 65 are all measured simultaneously.

The processing device 35 receives the second signal of thermal radiation $S_{TR2}$ and processes it according to the method later described.

Using two reflected beams 47, 65 and at least two radiated beams 17, 17b, 75 to determine the surface temperature Ts of the treated zone 13 helps reducing the uncertainty.

In another example (not represented), the apparatus 1 includes a second optical system to collect second reflected beam 65 and second radiated beam 75.

The second optical system also transmits second reflected beam 65 and second radiated beam 75 to their respective routing means which are arranged in another or the same multi-branch fiber bundle 27 described earlier.

In another embodiment (not represented), the apparatus 1 comprises a third illumination system in addition to or instead of the second illumination system 57.

The third illumination system comprises a third illumination source that emits a third beam of probing light at a third wavelength of probing light $\lambda_{PL3}$. The third wavelength of probing light $\lambda_{PL3}$ is for example a visible wavelength, for example 633 nm, and an example third light source is a HeNe laser. Alternatively, third wavelength of probing light $\lambda_{PL3}$ is for a near UV wavelength.

In the case of a visible third wavelength, the apparatus 1 comprises a third detector of probing light, for example a Si photodiode.

All other elements are similar to the ones previously described.

Referring to FIG. 12, we now describe the method for measuring the surface temperature Ts of a substrate 3 according to the invention.

The processed surface 5 of the substrate 3 is illuminated by a pulsed light beam 9, e.g. a pulsed laser beam, such as previously described. The pulsed light beam 9 heats the treated zone 13 of the processed surface 5. The treated zone 13 in turn emits thermal radiation 16 representative of its surface temperature Ts.

The method comprises a step of emitting the first beam of probing light 39 towards treated zone 13. The first beam of probing light 39 has a first wavelength of probing light $\lambda_{PL1}$, preferably in the infrared.

Then, in another step the first detector of thermal radiation 31 measures the first signal of thermal radiation $S_{TR1a}$ at a first instant $t_1$. The measurement is implemented by the controller 33.

In a simultaneous step, the first detector of probing light 55 measures the first signal of probing light $S_{PL1}$ at a second instant $t_2$. The measurement is implemented by the controller 33. The controller 33 synchronizes the first detector of thermal radiation 31 and the first detector of probing light 55 so that the first instant $t_1$ and second instant $t_2$ occur simultaneously.

Then, in a later step, the processing device 35 processes the first signal of thermal radiation $S_{TR1}$ and the first signal of probing light $S_{PL1}$.

The emissivity of the collection area 15 is calculated with the formula:

$$\epsilon(\lambda, t) = 1 - \left( R_{ref1}(\lambda) + (S_{PL1}(\lambda, r) - S_{ref1}(\lambda, t)) \cdot \frac{R_{ref2}(\lambda) - R_{ref1}(\lambda)}{S_{ref2}(\lambda) - S_{ref1}(\lambda)} \right)$$

where $S_{ref1}$ and $S_{ref2}$ are measured during a prior step of calibration of the first detector of probing light 55. During the calibration step, $R_{ref1}$ is a first expected value of a reflected calibration beam and $S_{ref1}$ is a corresponding first measured value of the reflected calibration beam. Likewise, $R_{ref2}$ is a second expected value of a reflected calibration beam and $S_{ref2}$ is a corresponding second measured value of the reflected calibration beam.

In a final step, the processing device 35 determines the surface temperature of the treated zone 13 at said first instant based on the first processed signal of thermal radiation and on first processed signal of probing light.

The formula used to calculate the surface temperature is:

$$T(\lambda, t) = \left( \frac{\frac{hc}{\lambda_{TR1} K}}{\ln\left(1 + \frac{2h \cdot c^2 \cdot K_{calib} \cdot \epsilon(\lambda, t)}{S_{TR1a}(\lambda, t) \cdot \lambda_{TR1}^5}\right)} \right)$$

where h is the Planck constant, c is the celerity of light, K is the Boltzmann constant and Kcalib is an instrumental constant of the first detector of thermal radiation 31a.

The value of $K_{calib}$ is first coarsely deduced from typical properties of the system with the following formula:

$$K_{calib} = R(\lambda) \cdot \tau \cdot G \cdot \Delta\lambda$$

where $R(\lambda)$ is the spectral sensitivity of the first detector of thermal radiation 31a. τ is the optical transmission. G is the etendue. Δλ is the spectral bandwidth. Then its value is finely determined for each instrument during a calibration step.

By basing the calculation of the surface temperature Ts on the first signal of thermal radiation $S_{TR1a}$ and the first signal of probing light $S_{PL1}$ acquired simultaneously and having similar directions, the uncertainty in the calculated surface temperature is greatly reduced.

The method may be applied to the other embodiments of the apparatus 1 previously described.

The method then further comprises a step of emitting a second beam of probing light 59 at the second wavelength of probing light $\lambda_{PL2}$ towards treated zone 13 of the processed surface 5 of the substrate 3.

Then in another step, the second detector of thermal radiation 83 measures a second signal of thermal radiation $S_{TR2}$ at a third instant $t_3$. The measurement is implemented by the controller 33. The third instant $t_3$ is simultaneous with the first instant $t_1$ and the second instant $t_2$.

In a simultaneous step the second detector of probing light 73 measures a second signal of probing light $S_{PL2}$ at a fourth instant ta. The measurement is implemented by the controller 33.

The controller 33 synchronizes the first detector of thermal radiation 31, the first detector of probing light 55, the second detector of thermal radiation 83 and the second detector of probing light 73 so that the first instant $t_1$, second instant $t_2$, third instant $t_3$ and fourth instant to occur simultaneously.

The temperature is calculated with the formula:

$$T(t) = \frac{\frac{hc}{k}\left(\frac{1}{\lambda_{TRLong}} - \frac{1}{\lambda_{TRshort}}\right)}{\ln\left(\frac{S_{thermal}(\lambda_{TRshort}, t)}{S_{thermal}(\lambda_{TRlong}, t)}\right) - \ln\left(\frac{\epsilon(\lambda_{PLshort}, t)}{\epsilon(\lambda_{PLlong}, t)}\right) - \ln\left(K'_{calib}\left(\frac{\lambda_{TRlong}}{\lambda_{TRshort}}\right)^5\right)}$$

Where $\lambda_{TPlong}$ corresponds to the longest wavelength between the first wavelength of thermal radiation $\lambda_{TR1}$ and the second wavelength of thermal radiation $\lambda_{TR2}$. $\lambda_{TRshort}$ corresponds shortest wavelength between the first wavelength of thermal radiation $\lambda_{TR1}$ and the second wavelength of thermal radiation $\lambda_{TR2}$.

$\lambda_{PLlong}$ corresponds to the longest wavelength between the first wavelength of probing light $\lambda_{PL1}$ and the second wavelength of probing light $\lambda_{PL2}$.

$\lambda_{PLshort}$ corresponds to the shortest wavelength between the first wavelength of probing light $\lambda_{PL1}$ and the second wavelength of probing light $\lambda_{PL2}$.

The invention claimed is:

1. Apparatus suitable for measuring a surface temperature of a substrate having a substantially planar processed surface, said apparatus comprising:
    a light source configured to illuminate a treated zone of the processed surface of the substrate with a pulsed light beam;
    a first illumination system emitting a first beam of probing light at a first wavelength of probing light towards said treated zone of the processed surface of the substrate;
    a first optical system configured to:
        collect a first radiated beam of thermal radiation radiated by a locally heated area in said treated zone over a first solid angle of thermal radiation in a first direction of thermal radiation; and transmit said first radiated beam to a first detection channel of thermal radiation adapted to deliver a first signal of thermal radiation representative, at a first instant, of a first intensity of the first radiated beam within a first bandwidth around a first wavelength of thermal radiation; and
        collect a first reflected beam of probing light reflected by said treated zone over a first solid angle of probing light in a first direction of probing light; and transmit said first reflected beam to a first detection channel of probing light adapted to deliver a first signal of probing light representative, at a second instant, of a first intensity of the first reflected beam at said first wavelength of probing light; and
    processing means configured to:
        process said first signal of thermal radiation and said first signal of probing light; and
        determine said surface temperature of the treated zone at said first instant based on said first processed signal of thermal radiation and said first processed signal of probing light;
    wherein:
    said first detection channel of thermal detection includes:
        a first detector of thermal radiation sensitive to said first wavelength of thermal radiation; and
        a first routing means of thermal radiation to route the first radiated beam to the first detector of thermal radiation; and said first detection channel of probing light includes:
  a first detector of probing light sensitive to said first wavelength of probing light; and
  a first routing means of probing light to route the first reflected beam to the first detector of probing light,
said first wavelength of thermal radiation is selected to be equal to said first wavelength of probing light;
said first detection channel of thermal radiation and said first detection channel of probing light are synchronized so that said first instant and said second instant occur at the same time;
said first routing means of thermal radiation is arranged in relation with said first routing means of probing light to prevent the first detector of thermal radiation from receiving part of the first reflected beam of probing light, wherein said first direction of thermal radiation is separated from said first direction of probing light by a first angle of deviation greater than zero and lower than a first predetermined threshold.

2. The apparatus according to claim 1, wherein said first wavelength of probing light is comprised in the range from 0.9 micrometer to 1.6 micrometer.

3. The apparatus according to claim 2, wherein said first bandwidth is smaller than, or equal to 100 nanometers.

4. The apparatus according to claim 1, wherein said first detection channel of thermal radiation comprises a first filter of thermal radiation having said first bandwidth.

5. The apparatus according to claim 1, wherein said first detection channel of probing light comprises a first filter of probing light, said first filter of probing light being a bandpass filter having a second bandwidth smaller than or equal to the first bandwidth.

6. The apparatus according to claim 4, wherein said first filter of thermal radiation or said first filter of probing light is an interferential filter.

7. The apparatus according to claim 1, wherein said first detector of thermal radiation and said first detector of probing light have the same relative spectral sensitivity.

8. The apparatus according to claim 1, comprising:
  a second illumination system emitting a second beam of probing light at a second wavelength of probing light towards said treated zone of the processed surface of the substrate;
  a second optical system configured to:
    collect a second radiated beam of thermal radiation radiated by said locally heated area of the treated zone over a second solid angle of thermal radiation in a second direction of thermal radiation; and transmit said second radiated beam to a second detection channel of thermal radiation including:
      a second detector of thermal radiation sensitive to a second bandwidth; and
      a second routing means of thermal radiation to route the second radiated beam of thermal radiation radiated in the second direction of thermal radiation to the second detector of thermal detection,
    said second detection channel of thermal radiation being adapted to deliver a second signal of thermal radiation representative, at the first instant, of a second intensity of the second radiated beam within said second bandwidth around a second wavelength of thermal radiation; and
    collect a second reflected beam of probing light reflected by said treated zone over a second solid angle of probing light in a second direction of probing light; and transmit said second reflected beam to a second detection channel of probing light including:
      a second detector of probing light sensitive to said second wavelength of probing light; and
      a second routing means of probing light to route the second reflected beam of probing light reflected in the second direction of probing light to the second detector of probing light,
    said second detection channel of probing light being adapted to deliver a second signal of probing light representative, at the second instant, of a second intensity of the second reflected beam of probing light at said second wavelength of probing light;
  said second bandwidth contains said second wavelength of probing light and is smaller than a predetermined maximum width; and
  said second direction of thermal radiation being separated from said second direction of probing light by a second angle of deviation greater than zero and lower than a second predetermined threshold;
  said processing means being configured to:
    process said second signal of thermal radiation and said second signal of probing light; and
    determine said surface temperature at the first instant based on said first processed signal of thermal radiation, said first processed signal of probing light, said second processed signal of thermal radiation and said second processed signal of probing light.

9. The apparatus according to claim 8, wherein said second optical system is distinct from said first optical system.

10. The apparatus according to claim 8, wherein said second optical system and said first optical system are the same.

11. The apparatus according to claim 1, wherein each of the routing means comprises a segment of optical fiber of predetermined length arranged between the corresponding optical system and the corresponding detector said optical system being designed to couple the corresponding beams into said segments of optical fibers.

12. The apparatus according to claim 11, wherein said segments of optical fibers are grouped together so as to form a fiber bundle.

13. Method for measuring a surface temperature of a substrate having a substantially planar processed surface, said method comprising the steps of:
  providing the substrate having a substantially planar processed surface,
  heating a treated zone of the processed surface of the substrate by illuminating the processed surface of the substrate with a pulsed light beam,
  emitting a first beam of probing light at a first wavelength of probing light towards said treated zone of the processed surface of the substrate,
  measuring, at a first instant, a first signal of thermal radiation representative of a first intensity of a first radiated beam of thermal radiation radiated, within a first bandwidth around a first wavelength of thermal radiation, by said treated zone over a first solid angle of thermal radiation in a first direction of thermal radiation;
  measuring, at a second instant, a first signal of probing light representative of a first intensity of a first reflected beam of probing light reflected, at said first wavelength of probing light, by said treated zone over a first solid angle of probing light in a first direction of probing light, processing said first signal of thermal radiation and said first signal of probing light; and determining said surface temperature of the treated zone at said first instant based on said first processed signal of thermal radiation and on said first processed signal of probing light;

wherein:

said first wavelength of thermal radiation is selected to be equal to said first wavelength of probing light;

said first direction of thermal radiation is separated from said first direction of probing light by a first angle of deviation greater than zero and lower than a first predetermined threshold; and said first detection channel of thermal radiation and said first detection channel of probing light are synchronized so that said step of measuring the first signal of probing light is performed at the same time as the said step of measuring the first signal of thermal radiation.

14. The method according to claim 13, further comprising the steps of:

emitting a second beam of probing light at a second wavelength of probing light towards said treated zone of the processed surface of the substrate, measuring, at a third instant, a second signal of thermal radiation representative of a second intensity of a second radiated beam of thermal radiation radiated, within a second bandwidth around a second wavelength of thermal radiation, by said treated zone over a second solid angle of thermal radiation in a second direction of thermal radiation;

measuring, at a fourth instant, a second signal of probing light representative of a second intensity of a second reflected beam of probing light reflected, at said second wavelength of probing light, by said treated zone over a second solid angle of probing light in a second direction of probing light, processing said second signal of thermal radiation and said second signal of probing light; and determining said surface temperature of the treated zone at said first instant based on said first processed signal of thermal radiation, said first processed signal of probing light, said processed second signal of thermal radiation and said processed second signal of probing light;

wherein:

said second wavelength of thermal radiation is selected to be equal to said second wavelength of probing light;

said second direction of thermal radiation is separated from said second direction of probing light by a second angle of deviation greater than zero and lower than a second predetermined threshold; and said second detection channel of thermal radiation and said second detection channel of probing light are synchronized so that said step of measuring the second signal of probing light and said step of measuring the second signal of thermal radiation are performed at the same time as said step of measuring the first signal of thermal radiation and said step of measuring the first signal of probing light.

15. The apparatus according to claim 2, wherein said first detection channel of thermal radiation comprises a first filter of thermal radiation having said first bandwidth.

16. The apparatus according to claim 3, wherein said first detection channel of thermal radiation comprises a first filter of thermal radiation having said first bandwidth.

17. The apparatus according to claim 2, wherein said first detection channel of probing light comprises a first filter of probing light, said first filter of probing light being a bandpass filter having a second bandwidth smaller than or equal to the first bandwidth.

18. The apparatus according to claim 3, wherein said first detection channel of probing light comprises a first filter of probing light, said first filter of probing light being a bandpass filter having a second bandwidth smaller than or equal to the first bandwidth.

19. The apparatus according to claim 4, wherein said first detection channel of probing light comprises a first filter of probing light, said first filter of probing light being a bandpass filter having a second bandwidth smaller than or equal to the first bandwidth.

20. The apparatus according to claim 5, wherein said first filter of thermal radiation or said first filter of probing light is an interferential filter.

\* \* \* \* \*